Sept. 3, 1963 F. L. LAPORTE 3,102,396
TEMPERATURE REGULATING CONTROL
Filed June 16, 1960 3 Sheets-Sheet 2
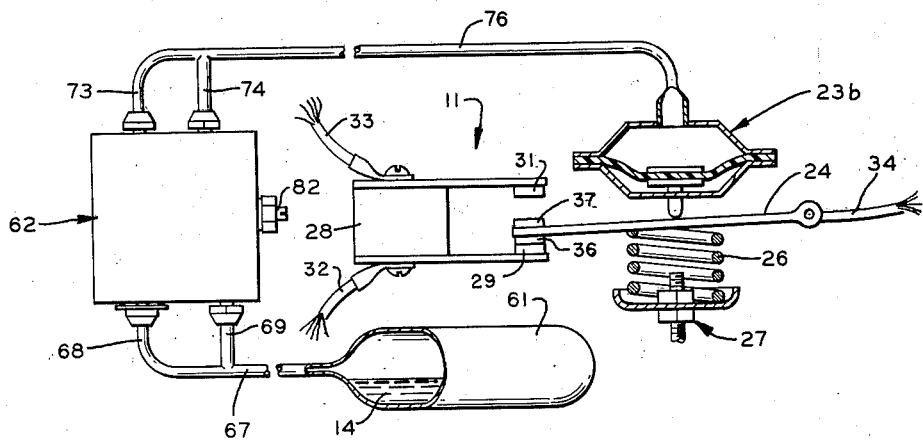
FIG_3_
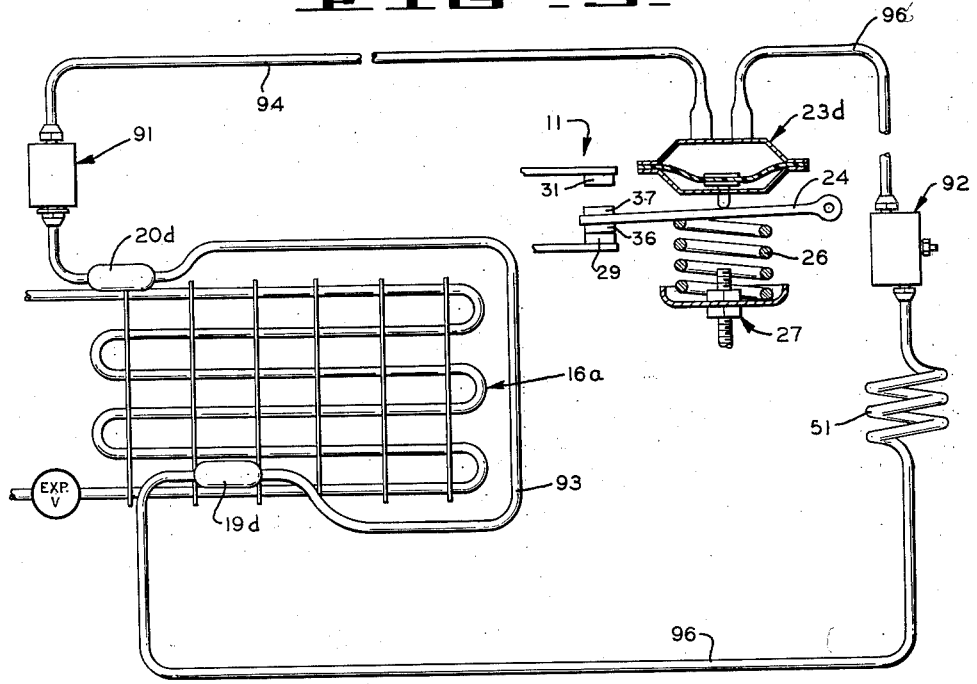
FIG_4_
INVENTOR.
FRANCIS L. LAPORTE
BY
Schapp & Hatch
ATTORNEYS Sept. 3, 1963        F. L. LAPORTE        3,102,396
TEMPERATURE REGULATING CONTROL
Filed June 16, 1960        3 Sheets-Sheet 3
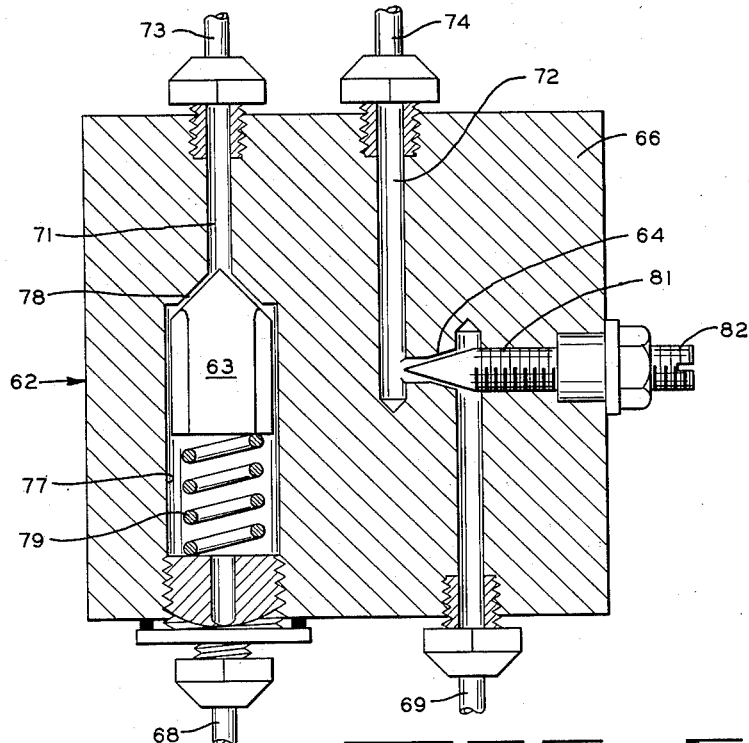
FIG_5_
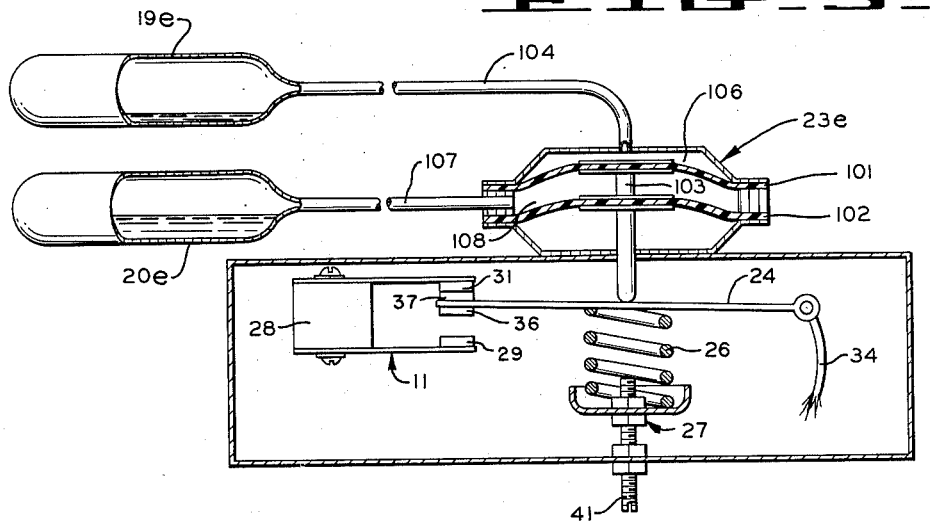
FIG_6_
INVENTOR.
FRANCIS L. LAPORTE
BY *Schapp + Hatch*
ATTORNEYS

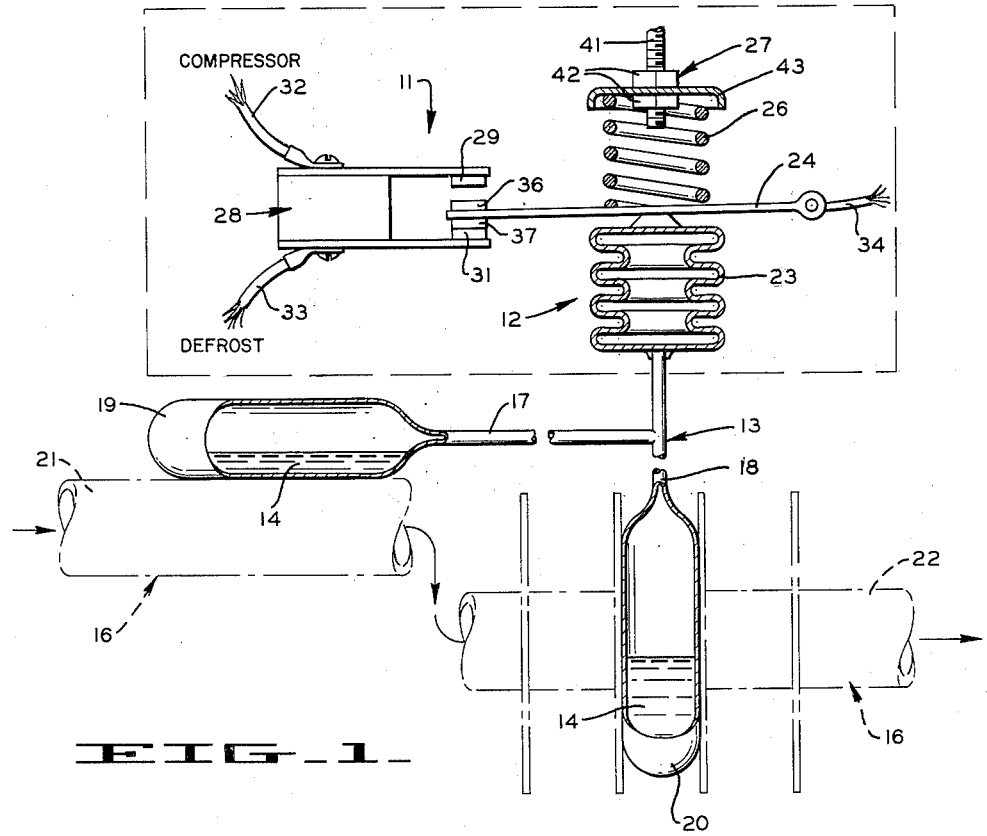
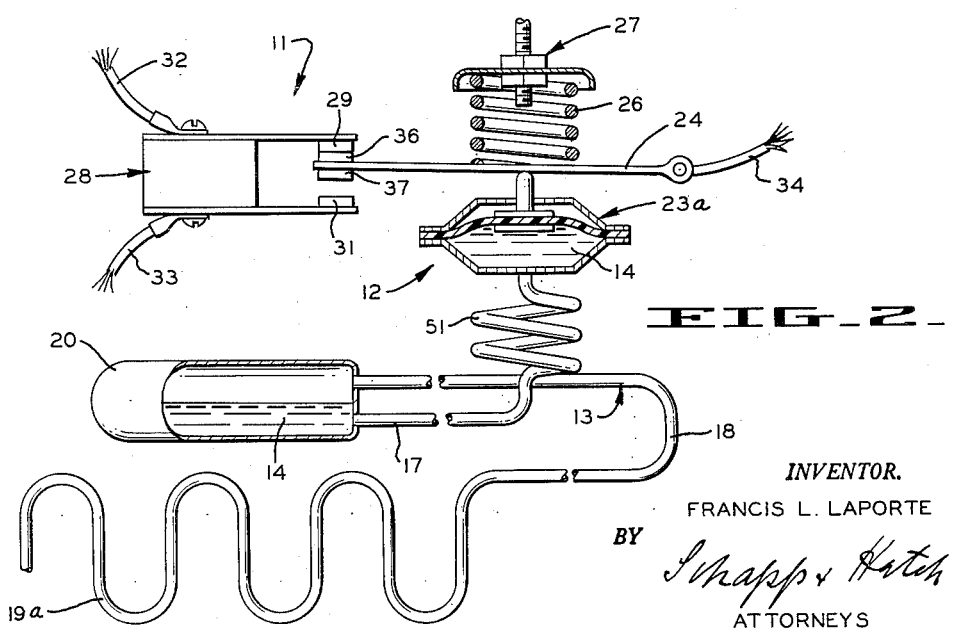

United States Patent Office 3,102,396
Patented Sept. 3, 1963

3,102,396
TEMPERATURE REGULATING CONTROL
Francis L. Laporte, 428 Claremont St., San Mateo, Calif.
Filed June 16, 1960, Ser. No. 36,610
5 Claims. (Cl. 62—156)

This invention relates to improvements in a temperature regulating control, and more particularly to devices for regulating the flow of heat to a body in accordance with temperatures at various portions of the body.

In a wide variety of types of apparatus heat is applied to a body or system in order to bring the system up to a desired temperature. Heat is often applied to the system at one point and spreads throughout the system to achieve the desired results.

A typical situation may be found in the refrigeration industry in connection with the defrosting of the evaporator coil. When frost builds up on such coils, it has an insulating effect reducing the heat transfer between the coil and the surrounding air. It then becomes necessary to remove the frost from the coil.

Probably the most efficient method for quickly removing such frost is to supply heat to the coil either through the coil itself or through a separate defrosting system. However, certain problems arise in controlling the length of time during which the heat is applied.

In order to maintain the contents of the refrigerator in chilled condition, the length of the defrost cycle should be as short as possible. Thus, the control should act to halt the supply of defrosting heat and resume the refrigerating process as soon as the coil is completely defrosted. In this connection, it should be kept in mind that the defrosting should be accomplished over the entire length of the coil, that is, defrosting should continue until all of the accumulated frost has melted and fallen from the coil.

Since the defrosting heat is usually applied to the coil at one end thereof or at spaced locations along the coil, various portions of the coil will warm up before other portions reach the desired temperature.

In order to obtain effective control of the defrosting cycle it is necessary that the defrosting heat be supplied to the evaporator coil until the coldest parts thereof have become defrosted. A single heat-responsive thermostatic means would not supply the required control in refrigerating apparatus wherein the coldest portion of the evaporator during the refrigerating cycle is not necessarily the coldest portion during the defrosting cycle.

For example, defrosting of the evaporator coil is often accomplished by valve means at the compressor which routes the hot refrigerant through the coil. This hot refrigerant often enters the coil at the same end as the cold refrigerant does during the refrigerating cycle, that is, at the end of the evaporator coil adjacent to the expansion valve. In such systems, during the refrigerating cycle, the intake end of the coil will be colder than the outlet end and frost will accumulate faster upon the intake end.

Similarly, during the defrosting cycle, the intake end of the coil will heat up and become defrosted faster than the outlet end of the coil.

An ordinary thermostatic means positioned at the intake end of the coil could therefore initiate the defrosting cycle at the desired time, but could not positively insure that the discharge end of the coil be defrosted without extending the defrosting period longer than necessary.

The present invention contemplates a control means which is operative to actuate the defrosting device until the coldest point on the coil has reached defrosting temperature at which moment the control will cut off the supply of defrosting heat and again initiate the refrigeration cycle. This is accomplished by a closed system containing vaporizable fluid connected to a pressure-responsive actuator which, when pressure is supplied thereto by such system, will operate a switching means adapted to turn off the defroster and resume the normal supply of refrigerant to the evaporator coil.

A heat sensing element is mounted locally on the body to cause the volatile fluid in the system to vaporize when the correct defrosting temperature has been reached at the coldest part of the coil, and means is provided for limiting the rise in pressure at the actuator until this end has been accomplished.

It is therefore, a principal object of the present invention to provide a temperature regulating control for a body subject to unevenly distributed changes in temperature which will respond to such changes in temperature in supplying heating and cooling effects to the body.

Another object of the present invention is to provide a device for controlling the refrigeration and defrosting cycles of refrigerating equipment in accordance with temperature changes at spaced portions of the refrigerating system.

A further object of my invention is to provide a temperature regulating control incorporating a pressure-responsive actuator and a plurality of temperature-responsive elements mountable in spaced relation on a refrigerator evaporator coil and formed for operating the actuator in response to changes of temperature in the coil.

Still another object of the present invention is to provide a temperature regulating control of the character described in which pressure rise occasioned by warming of one temperature sensitive element will be opposed by a pressure-reducing effect at a different temperature responsive element whereby actuation will not occur until pressure conditions are the same at both elements.

Further objects and advantages of my invention will appear as the specification continues, and the new and useful features of my invention will be fully defined in the claims hereto attached.

The preferred forms of my invention are illustrated in the accompanying drawings forming part of this application, in which:

FIGURE 1 is a schematic representation of a temperature regulating control constructed in accordance with the present invention;

FIGURE 2, a schematic representation of a modified form of the temperature regulating control of FIGURE 1;

FIGURE 3, a schematic representation of a further modified form of the temperature regulating control of the present invention;

FIGURE 4, a schematic representation of a fourth form of the invention;

FIGURE 5, a cross-sectional view of a check valve and manually adjustable restriction arrangement forming part of the system of FIGURE 3 and FIGURE 6, a further modified form of the temperature regulating control of the present invention.

While I have shown only the preferred forms of my invention, I wish to have it understood that various changes or modifications may be made within the scope of the claims hereto attached, without departing from the spirit of the invention.

Referring to the drawings in detail, FIGURE 1 depicts schematically a preferred form of the invention which includes a control means 11 for a body temperature changing device (not shown), a pressure responsive actuator 12 for the control means 11 and a closed system 13 operatively connected to the actuator and containing a fluid 14 adapted to vaporize above a predetermined temperature and to condense below said temperature, said system being adapted for mounting in heat-transmitting relation to a body 16 whereby cooling of the body below a predetermined average temperature will condense the fluid 14 and create a low pressure condition in the system 13, and heating of the body 16 will vaporize the fluid and create a higher pressure condition in the said system.

Incorporated in the system 13 is means for limiting the rise of pressure in the system at the actuator 12 until the entire body 16 has warmed to a predetermined temperature. In the form of the invention illustrated in FIGURE 1, the last-named means is provided by locating portions of the system 13 in heat-transmitting relation to spaced sections of the body 16 and providing conduits 17 and 18 connecting these portions to the actuator 12 in such manner that vaporized fluid from the warmer of the portions will condense in the colder of the portions until the body 16 at the latter portion has warmed to a predetermined temperature.

The control device of FIGURE 1 is particularly suited for use in controlling the refrigeration and defrosting cycles of an evaporator coil, and the associated portions of such a coil are illustrated in phantom lines in FIGURE 1. As here shown, bulb-type reservoirs 19 and 20 are formed for mounting in contact with the intake and outlet ends 21 and 22, respectively, of a refrigerator evaporator coil 16.

The actuator 12 is here provided by a Sylphon type bellows 23 which bears against a pivoted arm 24 forming part of the control means 11. A coil spring 26, having means 27 for adjusting the compression thereof, bears against the opposite of the arm 24.

The control means 11 here consists of the two-way switch means 28 having contacts 29 and 31 connected to leads 32—33, respectively, lead 32 being adapted for connection to the compressor motor of the refrigerating system (not shown) and lead 33 being adapted for connection to the defrosting means (also not shown).

Arm 24 is connected by leads 34 to a suitable source of power and is provided at its distal end with contacts 36 and 37 engageable with switch contacts 29 and 31, respectively, as the arm 24 moves up and down under the influence of the actuator 12.

During the refrigerating cycle, the frost will build up faster on the inlet end 21 of the evaporator coil 16 than it will on the remainder of the coil. The layer of frost acts as an insulating layer and retards the transmission of heat from the outside air to the cold refrigerant. As the frost layer builds up, the metal of the coil gets colder and colder.

Advantage is taken of this phenomenon to start the defrosting cycle when the layer of frost is built up to a predetermined thickness. Since the temperature of the metal of the coil at the intake end will be proportionate to the layer of frost, the defrosting cycle may be started when the temperature of the metal falls to a predetermined range.

The volatile liquid 14 may be any one of the vaporizable liquids commonly employed in refrigeration systems. The particular fluid used will be determined in part by the operating temperature at which the defrosting cycle should be started. At such temperature range the fluid should condense thus creating a low pressure condition in the closed system 13.

This will cause the bellows 23 to contract allowing the spring 26 to push the arm 24 downwardly and engage contacts 37 and 31 so as to supply current to the defrosting means. As the hot refrigerant enters the coil 16 through the intake end 21, it will warm up the metal of the coil and soon raise the temperature in the reservoir 19 above the vaporizing temperature of the fluid 14. The fluid will then vaporize and tend to increase the pressure in the system 13.

As an important feature of the present invention, rise in pressure at the actuator 12 sufficient to operate the actuator, is prevented until the rest of the coil has also reached the correct defrosting temperature.

This is accomplished by the reservoir 20 which is located at or near the exit end 22 of the evaporator coil 16. The vaporized fluid will pass from reservoir 19 and through the conduits 17 and 18 to the reservoir 20. So long as the outlet end 22 of the evaporator coil is below the pre-selected defrosting temperature, the vaporized fluid will condense in the reservoir 20, thus tending to reduce pressure in the system 13. This will continue until the exit end, and hence the entire coil, has reached the desired temperature at which time the fluid 14 in the reservoir 20 will also begin to vaporize.

The vaporized fluid will pass from reservoir 20 through conduit 18 and into the bellows 23.

As soon as the pressure has risen sufficiently to overcome the action of spring 26, the arm 24 will be moved upwardly disconnecting the defrosting means from the power lead 34 and bringing the contacts 36 and 29 into engagement to supply power to the compressor motor. This, of course, will re-initiate the refrigeration cycle. A conventional toggle action (not shown) may be connected to arm 24 so as to cause it to snap from one terminal position to the other.

Precise control of the temperature at which the switch means will be moved to the last-named position by the actuator 12 is here provided by the adjusting means 27 designed to vary the compression of the spring 26. Increasing compression upon the spring will increase the amount of pressure required in the actuator to overcome the spring and hence will raise the temperature at which the defrosting apparatus will be shut off and the refrigerating cycle recommenced.

As here shown, the means 27 includes a threaded rod 41, which may be secured to an convenient portion of the apparatus housing and which has nuts 42 screwed up against the opposite sides of a spring retainer 43 to hold the latter in desired position. It will be understood that any suitable means for adjusting the bias of the spring 26 may be used in place of the means 27.

In the form of the invention illustrated in FIGURE 2 of the drawings, reservoir 19 is replaced by a length of the conduit 18 long enough to provide a reservoir 19a which is equal in volume to the reservoir 20. This conduit may be curved back and forth in the manner shown for easy positioning between close-set fins of an evaporator coil.

The device of FIGURE 2 also substitutes a diaphragm type actuator 23a for the Sylphon bellows 23 of FIGURE 1. The switch means 11, arm 24, spring 26 and adjusting means 27 are the same as those shown in FIGURE 1 and like numerals are used throughout to designate like parts.

The essential difference between the forms of FIGURE 1 and FIGURE 2 is that the reservoir 19a is connected into series with the reservoir 20a, in FIGURE 2, rather than in parallel, as indicated in FIGURE 1. However, the parts function in a similar manner to produce the very same result, that is so vaporized fluid from reservoir 19a will pass into reservoir 20 and be condensed therein until the portion of the evaporator coil at which reservoir 20 is positioned has heated up to the desired temperature.

Preferably, conduit 18 connects reservoir 19a to the upper portion of reservoir 20 in the manner shown in the drawing. Conduit 17 connects the lower portion of the reservoir 20 to the actuator 23a through a restrictive coil 51. With this construction, the actuator 23a, coil 51 and conduit 17 are always filled with condensed fluid 14. The restrictive coil 51 serves to slow down the passage of the fluid between the reservoir 20 and the actuator 23a. This insures that the fluid in reservoir 20 must be heated above its vaporizing point in order to operate the actuator and slows down the action sufficiently to prevent any sudden surge in pressure, coming from reservoir 19a, from operating the actuator 23a.

FIGURE 3 illustrates a modified form of the invention in which a single reservoir 61 is positioned at the coldest part of the evaporator coil during the defrost cycle, that is near the outlet end of the coil, and a check valve and adjustable orifice unit 62 is interconnected between the reservoir 61 and diaphragm-type actuator 23b.

The unit 62 is shown in some detail in FIGURE 5 of the drawings and consists essentially of a check valve 63 and an adjustable orifice 64 mounted in a common housing 66. As here shown, the conduit 67 from the reservoir 61 splits into two branches 68 and 69, which communicate through passages 71 and 72, formed in housing 66, with branches 73 and 74 of a conduit 76 communicating with the actuator 23b. Mounted in an enlargement 77 of passage 71 is a valve member 63 biased toward the seat 78 by a spring 79. The arrangement of the valve 63 is such that increase in pressure in the conduit 68, caused by vaporizing of the fluid 14 in reservoir 61, will force the valve member closed. The vapor under pressure will then be forced to pass through conduit 69 and the adjustable orifice 64 in order to reach the actuator 23b.

This will delay the operation of the actuator until the outlet end, and consequently all of the evaporator coil, has heated up to the desired temperature. Adjustment of this time-delay is here provided by a needle valve 81 movable into the orifice 64 and having an end projecting outside the housing 66 for manual adjustment thereat.

Rotation of the needle valve 81 to cause it to move to the left, as viewed in FIGURE 5, will tend to close down the orifice 64, further restricting the passage of the vaporized fluid therethrough and thus creating a longer time-delay. Opening of the valve will, of course, have the opposite result and will shorten the time-delay.

When the refrigeration cycle is resumed, the reservoir 61 will be cooled sufficiently to condense the fluid 14 therein. This will create a low temperature condition in the conduit 67 and the pressure in conduit 76 will force the check valve open, the fluid under pressure passing therethrough down into the reservoir 61 and operating the actuator to allow the switch means 11 to move to its other terminal position.

The apparatus of FIGURE 4 utilizes a check valve 91 and adjustable orifice 92, similar to that used in the apparatus of FIGURE 3, in combination with reservoirs 19d and 20d located adjacent to the inlet and outlet ends of a refrigerator evaporator coil 16a. The reservoirs 19d and 20d are interconnected by a conduit 93. Conduits 94 and 96 connect the reservoirs 20d and 19d, respectively, to the diaphragm-type actuator 23d.

The check valve 91 is similar in internal construction to the check valve 63 shown in FIGURE 5, and the adjustable restriction device 92 is similar to the needle valve controlled orifice mounted in that figure. These units may be mounted in the same housing as illustrated in FIGURE 5, or may be separated, if desired. In either event, they operate in a manner analogous to that of the unit 62 shown in FIGURE 3.

The adjustable orifice 92 provides a restriction which slows down the operation of the actuator 23d to prevent sudden surges in pressure from operating the switch means 11 prematurely.

In the apparatus of FIGURE 4, it will be noted that heating up of reservoir 19d above the vaporizing point of the fluid contained therein will cause the vapor to pass through conduit 93 to reservoir 20d where it will condense until the temperature at the reservoir 20d rises above the vaporization point of the liquid. At this time the pressure in the conduit 96 will rise sufficiently to force the vaporized fluid to pass the restriction 92 until sufficient pressurized fluid is delivered to the actuator 23d to operate the same. As the reservoirs 19d and 20d cool down, the fluid will condense therein creating a localized low-pressure condition and causing the fluid under pressure to rush from the actuator 23d through conduit 94 and check valve 91 back into the reservoir.

The apparatus of FIGURE 6 likewise incorporates a pair of reservoirs 19e and 20e positionable near the inlet and outlet ends, respectively, of an evaporator coil. Reservoirs 19e and 20e function in a manner similar to reservoirs 19 and 20 of FIGURE 1. When frost accumulates on the evaporator coil adjacent to one of the reservoirs, it lowers the temperature and causes the vaporizable fluid to condense therein. Heating up of the evaporator coil, as by defrosting, tends to cause the fluid to vaporize within the adjacent reservoir. Thus the action in the reservoirs 19e and 20e proper is the same as the action in the reservoirs 19 and 20 of FIGURE 1. However, reservoirs 19e and 20e are not in communication with each other and the vaporized fluid from one will not condense in the other. In this, the action of the two reservoirs is cumulative, that is, the arrangement of parts is such that the fluid must vaporize in each before the actuator 23e will operate.

As may be seen from FIGURE 6, this is accomplished by providing actuator 23e with two diaphragms 101 and 102 and mechanically connecting these diaphragms by means of a member 103. Reservoir 19e communicates through conduit 104 with a chamber 106 on the upper side of the diaphragm 101, while reservoir 20e communicates through conduit 107 with a chamber 108 provided between the diaphragms 101 and 102. The strength of the spring 26 is such that pressure must be present in both reservoirs 19e and 20e. In this manner, the apparatus will not function to end the defrost cycle until the outlet of the evaporator coil adjacent to reservoir 20e has warmed above the defrost temperature.

The several variations of the system shown and described herein are adapted for uses other than for controlling the defrosting cycle of refrigerating apparatus. For example, any of the foregoing systems could be applied to the first and last steam radiators in a building heating system, so as to insure that steam would not be cut off until the last radiator had reached a desired temperature.

With such system of course, the radiators nearer to the source of supply of steam would use their manually-operated valves to prevent overheating.

The present system is adaptable also to uses in smelting or heat treating furnaces and the like where it is necessary to insure that the coldest portion of the furnace reaches a predetermined temperature, for instance, the melting point of the material being treated, or the minimum heat treating temperature.

From the foregoing, it will be seen that I have provided a novel temperature regulating control responsive to variations of temperature in a body for controlling the supply of heat to such body until the entire body is warmed to a predetermined temperature range.

I claim:

1. A defrosting control for a refrigeration apparatus having a compressor supplying refrigerant to an evaporator coil and a defroster for the coil, comprising control means for selectively operating said compressor and defroster, a pressure responsive actuator for said control means, and a closed system containing a vaporizable fluid and having reservoirs adapted to be positioned near the entrance and exit ends of the coil and conduits connecting said reservoirs to said actuator whereby vaporized fluid from the reservoir at the entrance end of the coil will condense in the reservoir at the exit end of the coil until the temperature of the coil at the latter end has reached the desired temperature range.

2. A defrosting control as defined in claim 1 and wherein the conduits from said reservoirs connect into a common header leading to said actuator.

3. A defrosting control as defined in claim 1 and wherein a conduit connects said reservoirs, and a second conduit connects the reservoir near the exit end of the coil to said actuator whereby vapor from the reservoir near the entrance end of the coil will pass into said first named reservoir on its way to said actuator to be condensed thereat until the exit end of the coil reaches a predetermined minimum temperature at which said vapor will not condense.

4. A defrosting control for a refrigeration apparatus having a compressor supplying refrigerant to an evaporator coil and a defroster for the coil comprising control means for selectively operating said compressor and defroster, a pressure responsive actuator for said control means, a closed system containing a vaporizable fluid and having reservoirs adapted to be positioned near the entrance and exit ends of the coil, conduits connecting said reservoirs to said actuator whereby vaporized fluid from the reservoir at the entrance end of the coil will condense in the reservoir at the exit end of the coil until the temperature of the coil at the latter end has reached the desired temperature range, a manually operable needle valve positioned in the conduit from the reservoir at the entrance end of the coil to said actuator and formed to provide an adjustable restriction therein for slowing down the passage of the vaporized fluid from said last-named reservoir to said actuator, and a check valve positioned in the conduit from the reservoir at the exit end of the coil to the actuator and formed to permit fluid flow therethrough from the actuator only.

5. A defrosting control for a refrigeration apparatus having a compressor supplying refrigerant to an evaporator coil and a defroster for the coil, comprising control means for selectively operating said compressor and defroster, a pressure responsive actuator for said control means, and a closed system containing a vaporizable fluid and having reservoirs adapted to be positioned near the entrance and exit ends of the coil and conduits connecting said reservoirs to said actuator whereby vaporized fluid under pressure from the reservoir at the entrance end of the coil will tend to operate the actuator to re-initiate the refrigeration cycle and vaporized fluid will condense in the reservoir at the exit end of the coil tending to lower the operating pressure at the actuator and prevent re-initiating the refrigeration cycle until the temperature of the coil at said exit end has reached a desired temperature range.

References Cited in the file of this patent

UNITED STATES PATENTS

| | | |
|---|---|---|
| 1,994,983 | De Florez | Mar. 19, 1935 |
| 2,133,966 | Buchanan | Oct. 25, 1938 |
| 2,156,322 | Timmis | May 2, 1939 |
| 2,178,200 | Cannon | Oct. 31, 1939 |
| 2,242,334 | Wile | May 20, 1941 |
| 2,531,136 | Kurtz | Nov. 21, 1950 |
| 2,573,151 | Lange | Oct. 30, 1951 |
| 2,577,902 | McGrath | Dec. 11, 1951 |
| 2,577,903 | McGrath | Dec. 11, 1951 |
| 2,666,298 | Jones | Jan. 19, 1954 |
| 2,773,354 | Tillman | Dec. 11, 1956 |
| 2,940,278 | Thompson | June 14, 1960 |